(12) United States Patent
Feuz et al.

(10) Patent No.: US 12,120,075 B2
(45) Date of Patent: *Oct. 15, 2024

(54) TRANSITIONING BETWEEN PRIVATE AND NON-PRIVATE STATE

(71) Applicant: GOOGLE LLC, Mountain View, CA (US)

(72) Inventors: Sandro Feuz, Zurich (CH); Sebastian Millius, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,119

(22) Filed: May 31, 2023

(65) Prior Publication Data

US 2023/0308407 A1    Sep. 28, 2023

Related U.S. Application Data

(63) Continuation of application No. 17/474,756, filed on Sep. 14, 2021, now Pat. No. 11,695,716, which is a
(Continued)

(51) Int. Cl.
*H04L 51/063* (2022.01)
*G06Q 10/10* (2023.01)
(Continued)

(52) U.S. Cl.
CPC ........... *H04L 51/063* (2013.01); *G06Q 10/10* (2013.01); *G06Q 10/107* (2013.01);
(Continued)

(58) Field of Classification Search
CPC ....... H04L 51/063; H04L 51/42; H04L 51/04; H04L 51/216; H04L 67/535; H04L 51/52; G06Q 10/10; G06Q 10/107
See application file for complete search history.

(56) References Cited

U.S. PATENT DOCUMENTS 6,510,458 B1  1/2003 Berstis et al.
7,509,384 B1  3/2009 Chen et al.
(Continued)

FOREIGN PATENT DOCUMENTS

CN   105554711   5/2016
CN   106055941   10/2016
(Continued)

OTHER PUBLICATIONS

Japanese Patent Office; Notice of Reasons for Rejection issued in App. No. 2021-057304, 11 pages, dated Jan. 30, 2023.
(Continued)

*Primary Examiner* — Jungwon Chang
(74) *Attorney, Agent, or Firm* — Gray Ice Higdon

(57) ABSTRACT

This specification is generally directed to techniques for automatically transitioning applications—especially those that enable exchange of messages between users—into and/or out of a private state based on a variety of signals associated with the messages and/or the participants themselves. In various implementations, an ongoing message exchange thread between two or more participants operating two or more respective message exchange clients may be examined. Based at least in part on the examining, a likelihood may be determined that message(s) directed by one of the participants to another of the participants as part of the ongoing message exchange thread would be deemed private by at least a given participant of the two or more participants. A determination may be made of whether the determined likelihood satisfies one or more thresholds, and in response, one or more of the message exchange clients may be transitioned into a private state.

20 Claims, 8 Drawing Sheets

Related U.S. Application Data continuation of application No. 16/563,033, filed on Sep. 6, 2019, now Pat. No. 11,153,241, which is a continuation of application No. 15/436,163, filed on Feb. 17, 2017, now Pat. No. 10,439,966.

(51) Int. Cl.
*G06Q 10/107* (2023.01)
*H04L 51/216* (2022.01)
*H04L 51/04* (2022.01)
*H04L 51/52* (2022.01)
*H04L 67/50* (2022.01)

(52) U.S. Cl.
CPC ............ *H04L 51/216* (2022.05); *H04L 51/04* (2013.01); *H04L 51/52* (2022.05); *H04L 67/535* (2022.05)

(56) References Cited

U.S. PATENT DOCUMENTS

| | | | |
|---|---|---|---|
| 7,603,413 B1* | 10/2009 | Herold | H04L 12/1813 709/204 |
| 7,885,910 B2 | 2/2011 | Chen et al. | |
| 8,464,350 B2 | 6/2013 | Kanevsky et al. | |
| 8,782,799 B2 | 7/2014 | Phillips et al. | |
| 8,935,798 B1 | 1/2015 | Smith | |
| 9,461,947 B1* | 10/2016 | Lan | H04L 67/535 |
| 9,519,408 B2 | 12/2016 | Shoemaker et al. | |
| 9,800,525 B1 | 10/2017 | Lerner et al. | |
| 10,439,966 B2 | 10/2019 | Feuz et al. | |
| 11,153,241 B2 | 10/2021 | Feuz et al. | |
| 2002/0191020 A1 | 12/2002 | Kaply et al. | |
| 2007/0143423 A1 | 6/2007 | Kieselbach et al. | |
| 2010/0005402 A1* | 1/2010 | George | H04L 51/04 715/758 |
| 2010/0082751 A1* | 4/2010 | Meijer | G06F 15/16 709/206 |
| 2010/0162388 A1 | 6/2010 | Baugher et al. | |
| 2012/0240237 A1 | 9/2012 | Kanevsky et al. | |
| 2013/0117392 A1 | 5/2013 | Aceves | |
| 2013/0246525 A1 | 9/2013 | Patil et al. | |
| 2014/0095634 A1 | 4/2014 | Govindaraman | |
| 2014/0298210 A1 | 10/2014 | Park et al. | |
| 2015/0163182 A1 | 6/2015 | Chandrasekaran | |
| 2015/0215247 A1 | 7/2015 | Gandhi | |
| 2015/0242654 A1 | 8/2015 | Gjonej et al. | |
| 2015/0288633 A1* | 10/2015 | Ogundokun | H04L 51/42 709/206 |
| 2015/0319141 A1 | 11/2015 | Jang et al. | |
| 2016/0018895 A1 | 1/2016 | Sidi | |
| 2016/0277335 A1* | 9/2016 | Cheung | H04L 51/04 |
| 2016/0366092 A1 | 12/2016 | Zhang et al. | |
| 2017/0251361 A1* | 8/2017 | Chan | G09G 5/003 |
| 2018/0089308 A1 | 3/2018 | Barsness et al. | |
| 2018/0158369 A1* | 6/2018 | Al Darwesh | G09B 21/007 |
| 2018/0165582 A1 | 6/2018 | Cha | |
| 2018/0217968 A1* | 8/2018 | Bastide | G06F 40/169 |
| 2018/0293983 A1 | 10/2018 | Choi et al. | |
| 2019/0163692 A1* | 5/2019 | Duan | G06F 16/3329 |
| 2021/0409361 A1 | 12/2021 | Feuz et al. | |

FOREIGN PATENT DOCUMENTS

| | | |
|---|---|---|
| JP | 2005332343 | 12/2005 |
| JP | 2008035234 | 2/2008 |
| JP | 2014507019 | 3/2014 |
| KR | 1020060043333 | 5/2006 |
| KR | 1020130035572 | 4/2013 |
| KR | 1020140038399 | 4/2015 |
| WO | 2012068518 | 5/2012 |
| WO | 20150164820 | 10/2015 |
| WO | 2016082194 | 6/2016 |

OTHER PUBLICATIONS

Japanese Patent Office; Notice of Reasons for Rejection issued in App. No. 2021-057304, 9 pages, dated Jun. 27, 2022.
European Patent Office; Communication pursuant to Article 94(3) EPC issued in Application No. 17808220.2; 7 pages; dated Dec. 13, 2021.
China National Intellectual Property Administration; Notification of First Office Action issued in Application No. 201711144486.6; 4 pages; dated Nov. 3, 2021.
Korean Patent Office; Notice of Allowance issue in the KR 10-20207035478; 3 pages; dated Jul. 14, 2021.
China National Intellectual Property Administration; Notification of First Office Action issued in Application No. 201711144486.6; 13 pages; dated May 13, 2021.
Japanese Patent Office; Notice of Allowance issue in application JP2019544731; 3 pages, dated Mar. 1, 2021.
Korean Patent Office; Office Action issue in the KR1020207035478; 8 pages; dated Jan. 8, 2021.
Japanese Patent Office; Office action issue in application JP2019544731; 11 pages, dated Aug. 31, 2020.
Korean Patent Office; Notice of Allowance issue in the KR 10-202070173; 3pages; dated Sep. 15, 2020.
Korean Patent Office; Office Action issue in the KR1020207017351; 6 pages; dated Aug. 3, 2020.
Korean Patent Office; Office Action issue in the KR 10-2019-7026070; dated Nov. 13, 2020.
Japanese Patent Office; Notice of Reasons for Rejection issue in Application 2019-544731; dated Mar. 9, 2020.
Korean Patent Office; Notice of Allowance issue in the KR 10-2019-7026070; dated Mar. 18, 2020.
International Search Report and Written Opinion of PCT Ser. No. PCT/US2017/059400; 11 pages Jan. 19, 2018.
United Kingdom Intellectual Property Office; Combined Search and Examination Report issued in Application No. 1717537.3 dated Apr. 20, 2018.
European Patent Office; Written Opinion of the International Preliminary Examining Authority for PCT Application No. PCT/US2017/059400; 5 pages; dated Jul. 2, 2018.

* cited by examiner

You

Guess what?

Sally

What?

You

** got fired for ** $!

Sally

No way!

Fig. 4C

TRANSITIONING BETWEEN PRIVATE AND NON-PRIVATE STATE

BACKGROUND

Message exchange threads such as chat, email exchanges, text messaging, and so forth may contain information that may be sensitive (e.g., confidential) to one or more of the participants. A participant in the message exchange thread may desire that at least some content of the message exchange thread not be retained (e.g., in a log) or at least available in its original, sensitive form. Many internet applications enable a user to transition the application into a private state (e.g., "Off the Record," "Incognito mode," "InPrivate," etc.) if the user will be engaging in activity that the user deems to be sensitive. However, in most cases—particularly with message exchange clients such as chat clients, text messaging clients, email clients, etc. —this transition must be initiated by the user manually. Moreover, the user also must transition the application out of the private state; it typically does not occur automatically, especially in message exchange clients. Consequently, information that a user would otherwise prefer remain confidential or not retained at all may be accidently persisted or stored (e.g., in a message exchange log, as a transcript of a message exchange thread, etc.) because the user forgot to transition the application to the private state. This persisted information may potentially be exposed to unauthorized parties. Likewise, if a user forgets to transition an application such as a chat client out of a private state, the user may accidently lose content that the user would otherwise prefer to retain.

SUMMARY

This specification is generally directed to techniques for automatically transitioning applications—especially those that enable exchange of messages between users (e.g., message exchange clients such as chat applications, email clients, web pages that facilitate message exchange threads, etc.)—into (and in some cases, out of) a private state based on a variety of signals associated with the messages and/or the participants themselves. Once in the private state, information deemed sensitive (e.g., confidential) may be obfuscated (e.g., names or other sensitive words or phrases may be scrambled), or the application may refrain from storing (e.g., in a log or message exchange thread transcript) the sensitive information.

In various implementations, an ongoing message exchange thread between one or more participants may be examined, e.g., at individual message exchange clients operated by the individual participants and/or centrally at one or more servers that facilitates the message exchange thread. Based on the examination, a likelihood may be determined (e.g., calculated) that one or more messages directed by one of the participants to another of the participants as part of the ongoing message exchange thread would be deemed private by at least a given participant. This likelihood may be determined in various ways based on various signals.

In some implementations, the likelihood may be determined based on content of one or more messages themselves. For example, in some implementations, certain phrases may be classified as "privacy trigger phrases" that when detected, cause one or more message exchange clients operated by a participant of the ongoing message exchange thread to transition into a private state. These privacy trigger phrases may include phrases such as "off the record," "let's keep this between us," "can you promise to not tell anyone?", etc. In some such implementations, one or more messages that follow (and in some instances, precede) such a privacy trigger phrase may not be retained, e.g., until a user manually transitions a message exchange client out of private state or until it is detected that the topic of discussion has changed to less-sensitive subject matter.

In other implementations, particular n-grams or combinations of n-grams (whether or not they are adjacent) may be used to trigger transition to private state. For example, suppose a user provides, into a message exchange thread, the statement, "I heard Bill is getting fired because he was caught stealing money." N-grams such as "fired," "caught," and "stealing" may, alone or in combination, trigger transition into private state. In some implementations, one or more of the n-grams in combination with an entity name (e.g., "Bill") may trigger transition into private state. In some such implementations, when in private state, the statement may be obfuscated (e.g., "I heard * is getting fired because * was caught stealing money) when it is persisted (e.g., as part of a transcript of the message exchange thread) so that potentially user-identifying n-grams are no longer available. In other implementations, the entire statement may be redacted or simply not stored in the message exchange thread transcript.

Additionally or alternatively, in some implementations, one or more other signals associated with one or more message exchange participants may be used to determine a likelihood that one or more messages exchanged in the message exchange thread would be deemed private by at least one participant. In some implementations, historical behavior associated with one or more of the message exchange thread participants, or in some cases associated with message exchange thread participants generally (i.e., participants in other message exchange threads) may be considered. Historical behavior may include, for instance, browsing history of one or more participants, historical utilization of a browser private state by one or more participants, historical utilization of a private state associated with a message exchange client by one or more participants, etc. For example, suppose one or more employees in an employer-facilitated message exchange thread manually transition their respective message exchange clients to a private state whenever certain subject matter is discussed as part of the employer-facilitated message exchange thread. In various implementations, this historical behavior associated with these employees may be "learned" so that similar behavior may later be detected and trigger automatic transition to a private state.

In some implementations, one or more trained machine learning models, such as convolutional neural network models and/or recurrent neural network models, may be employed to determine a likelihood that message exchange content would be deemed private by one or more participants. For example, a machine learning model may be trained using labeled training examples associated with instances in which message exchange thread participants manually transitioned message exchange clients into private states. Features of these training examples may include, for instance, n-gram(s) contained in the message exchange thread, phrases (e.g., "can you keep this between us") contained in the message exchange thread, contextual cues (e.g., identities of participants, location of participants, etc.), historical user behavior associated with one or more participants, and so forth. Once the machine learning model is trained, it may be applied, e.g., at individual computing devices operating message exchange clients or at central nodes that facilitate message exchange threads, across a plurality of inputs to determine a likelihood that, given the inputs, one or message exchange thread participants would deem at least a portion of the message exchange thread to be private. In some implementations, such machine learning models may be stored and/or applied on individual participants' computing devices.

In various implementations, the likelihood that a particular message exchange thread participant would deem at least a portion of a message exchange thread to be private may be compared to one or more thresholds. For example, the likelihood may be calculated numerically (e.g., in a range of 1 to 100, 0.0 to 1.0, etc.) and compared to some minimum threshold (e.g., 60, 0.7, etc.). If the likelihood exceeds the minimum threshold, a message exchange client operated by the message exchange thread participant may be transitioned to a private state. In some implementations, the participant may be provided (e.g., by the message exchange client) with a prompt soliciting permission to transition the message exchange client into the private state. In other implementations, no permission may be solicited. In yet other implementations, permission to transition into private state may be solicited only if the likelihood measure satisfies a first minimum threshold (e.g., 50, 0.5) but not a second, e.g., higher threshold (e.g., 80. 0.8).

If only a single participant's message exchange client is transitioned into a private state, then the message exchange thread content deemed potentially private may not be retained on that participant's computing device, but may be retained on other participants' computing devices. Accordingly, in some implementations, if a single participant's message exchange client transitions into a private state, that message exchange client (or some other component such as a central, cloud-based component that manages the message exchange thread) may transmit a command to other participants' message exchange clients to transition to private states. In some implementations, the other participants may be prompted for permission (e.g., at their respective message exchange clients) to enter into private state, e.g., with an explanation as to why. In other implementations, the other participants' message exchange clients may be automatically transitioned into private state.

In some implementations, a method performed by one or more processors is provided that includes: examining, by one or more processors, an ongoing message exchange thread between two or more participants operating two or more respective message exchange clients; determining, by one or more of the processors, based at least in part on the examining, a likelihood that one or more messages directed by one of the two or more participants to another of the two or more participants as part of the ongoing message exchange thread would be deemed private by at least a given participant of the two or more participants; determining, by one or more of the processors, that the determined likelihood satisfies one or more thresholds; and transitioning one or more of the two or more message exchange clients into a private state in response to determining that the determined likelihood satisfies one or more thresholds.

These and other implementations may optionally include one or more of the following features. In various implementations, determining the likelihood may be based at least in part on content of one or more messages forming part of the ongoing message exchange thread. In various implementations, determining the likelihood may be further based on historical behavior associated with the given participant. In various implementations, the historical user behavior may include a browsing history of the given participant. In various implementations, the historical user behavior may include historical utilization by the given participant of a private state associated with a web browser. In various implementations, the historical user behavior may include historical utilization by the given participant of a private state associated with a message exchange client.

In various implementations, determining the likelihood may be further based on historical behavior associated with the two or more participants in the ongoing message exchange thread. In various implementations, determining the likelihood may be further based on historical behavior associated with a plurality of participants in a plurality of message exchange threads outside of the ongoing message exchange thread. In various implementations, the historical behavior associated with a plurality of participants in a plurality of message exchange threads may include one or more associations between content of one or messages exchanged in the plurality of message exchange threads and manual transition, by one or more of the plurality of participants, of respective message exchange clients to a private state.

In various implementations, determining the likelihood may include applying a plurality of inputs associated with the given participant across a neural network model, wherein the neural network model is trained to provide, based on the plurality of inputs, output that includes the likelihood. In various implementations, the neural network model may be stored on a computing device used by the given participant to participate in the ongoing message exchange thread. In various implementations, the neural network model may be downloaded to the computing device used by the given participant, and the neural network model may be trained using training examples obtained from a plurality of message exchange threads outside of the ongoing message exchange thread.

In various implementations, the method may further include transmitting, from a first message exchange client of the two or more message exchange clients to a second message exchange client of the two or more message exchange clients, a command that causes the second message exchange client to transition to the private state, wherein the transmitting is performed in response to determining that the determined likelihood satisfies the one or more thresholds. In various implementations, in the private state, the one or more of the two or more message exchange clients may obfuscate at least a portion of a log of messages exchanged as part of the ongoing message exchange thread. In various implementations, in the private state, the one or more of the two or more message exchange clients may refrain at least temporarily from updating a log of messages exchanged as part of the ongoing message exchange thread.

In various implementations, the method may further include providing, by a given message exchange client of the two or more message exchange clients in response to determining that the likelihood satisfies the one or more thresholds, a prompt that solicits permission to transition the given message exchange client to the private state.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4C illustrates an example of a message exchange thread transcript that has been partially obfuscated.

DETAILED DESCRIPTION

Figure 1:
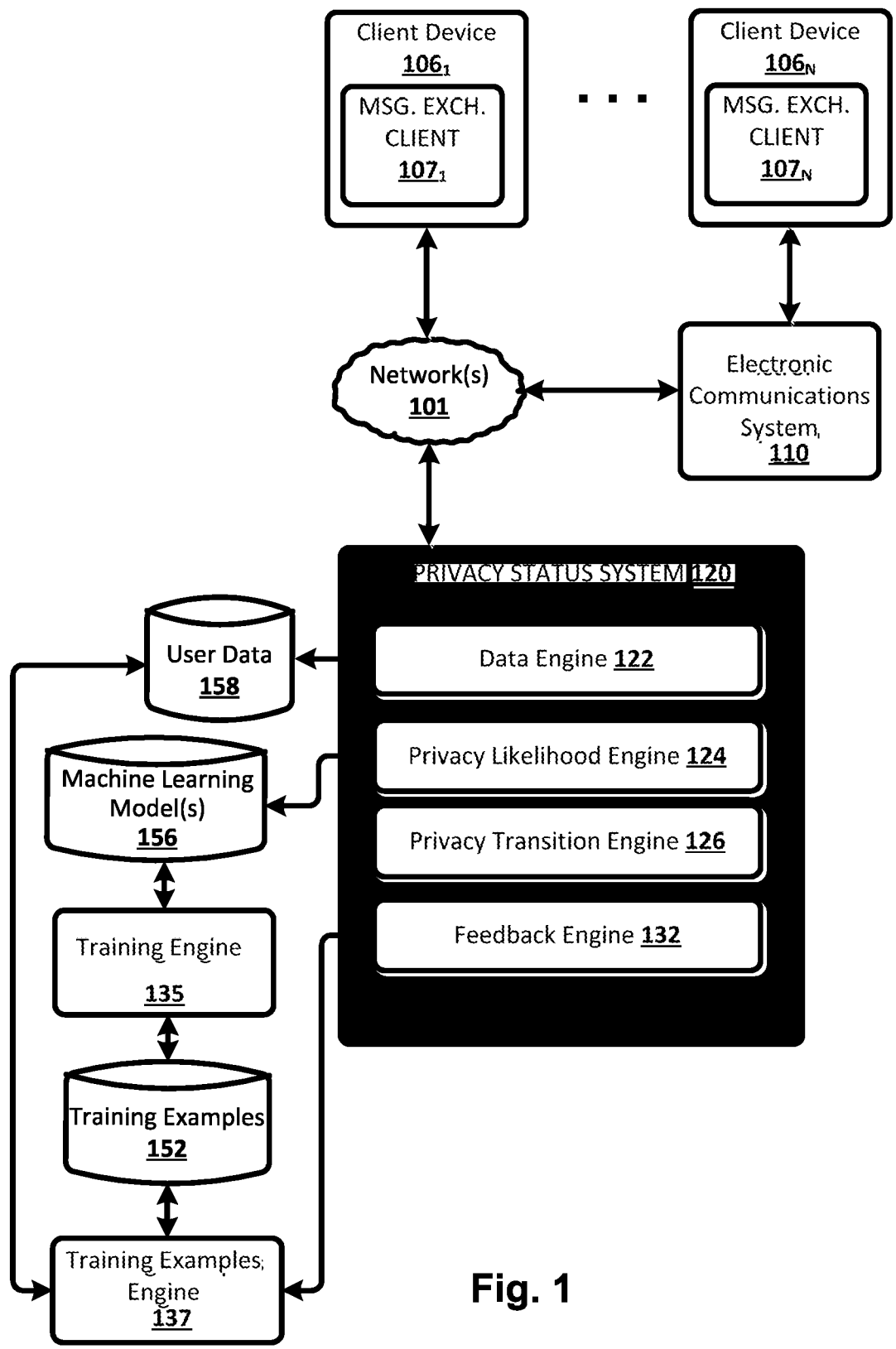
FIG. 1 is a diagram of an example environment in which implementations disclosed herein may be implemented.

In FIG. 1, an example environment in which techniques disclosed herein may be implemented is illustrated. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques.

The example environment also includes one or more client devices $106_{1-N}$, electronic communications system 110, privacy status system 120, training engine 135, and training examples engine 137. The example environment further includes user data 158, training examples 152, and machine learning model(s) 156. The user data 158, training examples 152, and machine learning model(s) 156 may each be stored in one or more corresponding computer readable media.

Some non-limiting examples of client device(s) $106_{1-N}$ include one or more of: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker (e.g., a so-called "smart speaker"), or a wearable apparatus that includes a computing device (e.g., a watch having a computing device, glasses of having a computing device, a virtual or augmented reality computing device). Additional and/or alternative client devices may be provided. For various examples herein, client device $106_1$ will be assumed to be a client device of a first user, client device $106_2$ a client device of a second user, client device $106_3$ a client device of a third user, etc. However, it is understood that privacy status system 120 may interface with each of a plurality of client devices and/or other electronic devices of a given user that form a coordinated "ecosystem" of client devices of the given user.

For example, as described herein, user data 158 utilized by the privacy status system 120 may include sensor-based data and/or other data based on client device $106_1$, as well as other data that is based on other electronic devices of a user of the client device $106_1$. However, for the sake of brevity, some examples described in this disclosure will focus on a single client device of a corresponding user.

Electronic communications system 110, privacy status system 120, and/or engines 135 and/or 137 may each be implemented in one or more computing devices that communicate, for example, through a network (e.g., network 101 and/or other network). Electronic communications system 110, privacy status system 120, and engines 135 and 137 are example components via which the systems and techniques described herein may be implemented and/or with which systems and techniques described herein may interface. They may each include one or more memories for storage of data and software applications, one or more processors for accessing data and executing applications, and other components that facilitate communication over a network. In some implementations, electronic communications system 110, privacy status system 120, and/or engines 135 and/or 137 may include one or more components of the example computing device of FIG. 6. The operations performed by electronic communications system 110, privacy status system 120, and/or engines 135 and/or 137 may be distributed across multiple computer systems, including wholly or in part on one or more client devices 106.

In some implementations, one or more aspects of one or more of electronic communications system 110, privacy status system 120, and/or engines 135 and/or 137 may be combined in a single system and/or one or more aspects may be implemented on one or more of the client device(s) $106_{1-N}$. For example, the client device $106_1$ may include an instance of one or more aspects of the privacy status system 120 and each of the additional client device(s) $106_{2-N}$ may also include an instance of one or more aspects of the privacy status system 120. As another example, each of the client device(s) $106_{1-N}$ may each include an instance of the electronic communications system 110 (e.g., the electronic communications system 110 may be an application installed and executing on each of the devices). As yet another example, one or more aspects of electronic communications system 110 and privacy status system 120 may be combined.

The electronic communications system 110 may include one or more remote servers and/or one or more client-side applications associated with the exchange of one or more types of electronic communications between client devices (often referred to herein as "message exchange threads"). Types of electronic communications that may be exchanged in a message exchange thread include, for example, emails, rich communication services (RCS) messages, short message service (SMS) messages, multimedia messaging service (MMS) messages, over-the-top (OTT) chat messages, social networking messages, audible communications (e.g., phone calls), audio-video communications, etc. As one example, electronic communications system 110 may include one or more remote servers that manage message exchange threads between various client devices 106, and those various client devices 106 may optionally each include a corresponding message exchange client 107. As another example, electronic communications system 110 may be implemented solely via client-side applications operating on corresponding client devices.

Examples of the privacy status system 120 will be described herein with respect to a user of the client device $106_1$. When users operate client devices 106 generally (e.g., $106_1$, ... ) to participant in message exchange threads, those users may be referred to as message exchange thread "participants." In some implementations, the privacy status system 120 may be implemented, in whole or in part, on the client device $106_1$. In some implementations, one or more of the components of the privacy status system 120 may additionally or alternatively be implemented on one or more servers that are remote from the client device $106_1$. For example, one or more components may be implemented on a remote server of the electronic communications system 110.

In various implementations, privacy status system 120 may include a data engine 122, a privacy likelihood engine 124, a privacy transition engine 126, and/or a feedback engine 132. In some implementations, aspects of engines 122, 124, 126, and/or 132 may be omitted, combined, and/or implemented in a component that is separate from privacy status system 120.

The data engine 122 selects user data 158 for use in determining a likelihood that a message exchange thread participant would deem content of an ongoing message exchange thread to be sensitive. In some implementations, the user data 158 includes sensor-based data that is generated based on output from sensors of the client device $106_1$ and/or other electronic device(s) of the participant. In some implementations, the user data 158 additionally or alternatively includes computer-based action data that is generated based on participant activities via the client device $106_1$ and/or other electronic device(s) of the participant. In some implementations, the user data 158 additionally or alternatively includes historical data that indicates historical behavior associated with the participant. In some implementations, such historical behavior may include a browsing history of the participant, utilization by the participant of a private state associated with an application such as a web browser, chat history, and/or historical utilization by the participant of a private state associated with message exchange client 107.

In some implementations, user data 158 may include aggregate data associated with a plurality of users (or message exchange thread participants). For example, in some implementations, the aggregate user data may be indicative of historical behavior associated with two or more participants of an ongoing message exchange thread, and/or with a plurality of participants of a plurality of message exchange threads outside of the ongoing message exchange thread. In some implementations, the historical behavior associated with a plurality of participants in a plurality of message exchange threads may include one or more associations between content of one or messages exchanged in the plurality of message exchange threads and manual transition, by one or more of the plurality of participants, of respective message exchange clients to private states. As described herein, the user of the client device $106_1$ (i.e. participant) may be provided with an opportunity to control whether and/or which user data 158 is accessible to the data engine 122 and/or other components of the privacy status system 120.

Sensor-based data may be generated based on, for example, output from a global position system (GPS) sensor, an accelerometer, a microphone, a camera, a gyroscope, and/or other sensor(s). Sensor-based data may include raw sensor data (e.g., output as received from the sensor) and/or may include generalized sensor data that is determined based on output from one or more sensors. For example, the sensor-based data may include the raw audio data from a microphone and/or may include generalization(s) of the raw audio data. The generalization(s) of the raw audio data may include, for example, an average (and/or other statistical measure) decibel level over a time period, classification(s) of the raw audio data based on applying the data to a classifier (e.g., classification(s) such as "noisy", "quiet", "music", etc.), etc. As another example, the sensor-based data may additionally or alternatively include raw GPS data and/or may include generalization(s) of the GPS data. The generalization(s) of the GPS data may include, for example, a classification of a location indicated by the GPS data (e.g., restaurant, cinema, workout facility), a particular location indicated by the GPS data (e.g., Restaurant A, Cinema A), etc. As yet another example, the sensor-based data may additionally or alternatively include raw accelerometer data and/or generalization(s) of such data. The generalization(s) of the raw accelerometer data may include an average (and/or other statistical measure) speed based on the data from the accelerometer, classification(s) of activity based on applying the data to a classifier (e.g., classification(s) such as "running", "walking", "stagnant"), etc.

Computer-based action data that is generated based on user activities via the client device $106_1$ and/or other electronic device(s) of the user may include, for example: calendar entries and/or other electronic documents created via the device(s); document(s) interacted with (e.g., visited) via the device(s); application(s) currently or recently utilized via the device(s); state(s) of application(s) currently or recently utilized via the device(s); average (or other statistical measure) processing power consumed over a recent time period; etc.

The privacy likelihood engine 124 utilizes the data selected by the data engine 122 to determine a likelihood that a particular message exchange thread participant (e.g., a user of client device $106_1$) will deem content of an ongoing message exchange thread to be sensitive. The likelihood determined by the privacy likelihood engine 124 will be dependent on the user data 158 and the message exchange thread content. In various implementations, the privacy likelihood engine 124 may receive "fresh" data from the data engine 122 continuously, periodically, or at other regular and/or non-regular intervals to enable dynamic determination of a likelihood that a message exchange thread participant will deem content of the ongoing message exchange thread to be sensitive. In some implementations, the privacy likelihood engine 124 applies the data as input to one or more of the machine learning model(s) 156, generates output over those machine learning model(s) 156 based on the input, and determines the likelihood based on the generated output.

The privacy transition engine 126 may be configured to transition one or more applications operating on one or more client devices 106 into and/or out of a so-called "private state." As used herein, a "private state" of an application refers to an application state in which the application takes various measures to ensure various information associated with operation of the application is protected, obfuscated, or simply not retained at all. For example, when a web browser is transitioned into a private state, the web browser may refrain from storing a history of websites or other network resources visited or otherwise accessed by the web browser while in the private state. Additionally, the web browser may refrain from storing information such as cookies, user credentials, etc., while in a private state.

In the context of message exchange client applications $107_{1-N}$, a private state may refer to a state in which the message exchange client 107 refrains from storing, obfuscates, and/or filters messages exchanged between one or more participants of a message exchange thread, and/or between a participant of a message exchange thread and a so-called "automated assistant." An "automated assistant" may refer to a software process with which a user may interact conversationally, e.g., using typed text or spoken input (which may be converted into text). For example, client devices 106 in the form of standalone interactive speakers may enable users to engage in a human-to-computer dialog with an automated assistant in which a user can ask questions (e.g., search documents, seek information, ask for weather/scores, etc.) and/or issue commands (e.g., play a particular song, turn on the lights, set a timer, store a reminder, etc.). Other client devices 106 such as smart phones, tablet computers, smart watches, etc., may include automated assistants that facilitate similar interactive dialog with a user.

Privacy transition engine 126 may determine that the likelihood determined by privacy likelihood engine 124 satisfies one or more thresholds. Based on such a determination, privacy transition engine 126 may transition, or may trigger transition of, one or more message exchange clients 107 (or more generally, client device 106) into a private state. Various types of thresholds may be compared to a likelihood that content of a message exchange thread would be deemed sensitive to at least one participant. In some implementations in which the likelihood calculated by privacy likelihood engine 124 is calculated as a number or measure (e.g., in a range of 0.0-1.0, 0-100, etc.), a numeric threshold may be used. In some implementations, multiple thresholds may be employed. For example, if a likelihood determined by privacy likelihood engine 124 satisfies a first threshold but not a second higher threshold, one or more message exchange clients 107 may provide audible or visual output in the form of a prompt that solicits permission to transition the a message exchange client 107 to the private state. However, if both the first and second thresholds are satisfied, one or more message exchange clients 107 that are operated by participants of the ongoing message exchange thread may automatically transition into private states, e.g., with or without notifying the respective participants operating the message exchange clients 107.

In various implementations in which an ongoing message exchange thread involves multiple participants operating multiple message exchange clients 107, transition of one message exchange client 107 into a private state may or may not result in transition of one or more of the other message exchange clients 107 into private states. For example, in some implementations, a first message exchange client 107 that transitions into a private state may transmit, to a second message exchange client, a command that causes the second message exchange client to transition to the private state. In some implementations, this transmission may occur in response to a determination, e.g., by privacy transition engine 126, that the likelihood determined by privacy likelihood engine 124 satisfies one or more thresholds.

Suppose it is determined by an instance of privacy status system 120 (including respective instances of data engine 122, privacy likelihood engine 124, and/or privacy transition engine 126) operating on a given client device 106 that there is a particular likelihood that a participant operating a respective message exchange client 107 on the given client device 106 would deem content of an ongoing message exchange thread to be sensitive. Suppose further that the likelihood satisfies a first threshold, but not a second higher threshold. In some implementations, such a scenario would result in privacy transition engine 126 only transitioning the local message exchange client 107 into the private state. In other implementations, such a scenario would result in the local message exchange client 107 transitioning into the private state and requesting other message exchange clients 107 that are participating in the message exchange thread to transition into private states (in which case they may, for instance, prompt a respective message exchange thread participant for permission).

The feedback engine 132 may use solicited and/or non-solicited feedback of the user/participant of a client device 106 to provide to training examples engine 137. The training examples engine 137 may utilize the feedback in generating further training examples for refining one or more of the machine learning model(s) 156. As one example, assume a participant of in a message exchange thread manually transitions her respective message exchange client 107 into a private state. The feedback engine 132 may provide, to the training examples engine 137, an indication of the manual transition, as well as various inputs (e.g., user data 158, content of the message exchange thread) that are currently applicable to the manually-transitioning participant. The training examples engine 137 may then utilize the data to generate training example input of a training example, and may generate training example output of the training example based on the manual transition of the message exchange client 107 to the private state.

Figure 2:
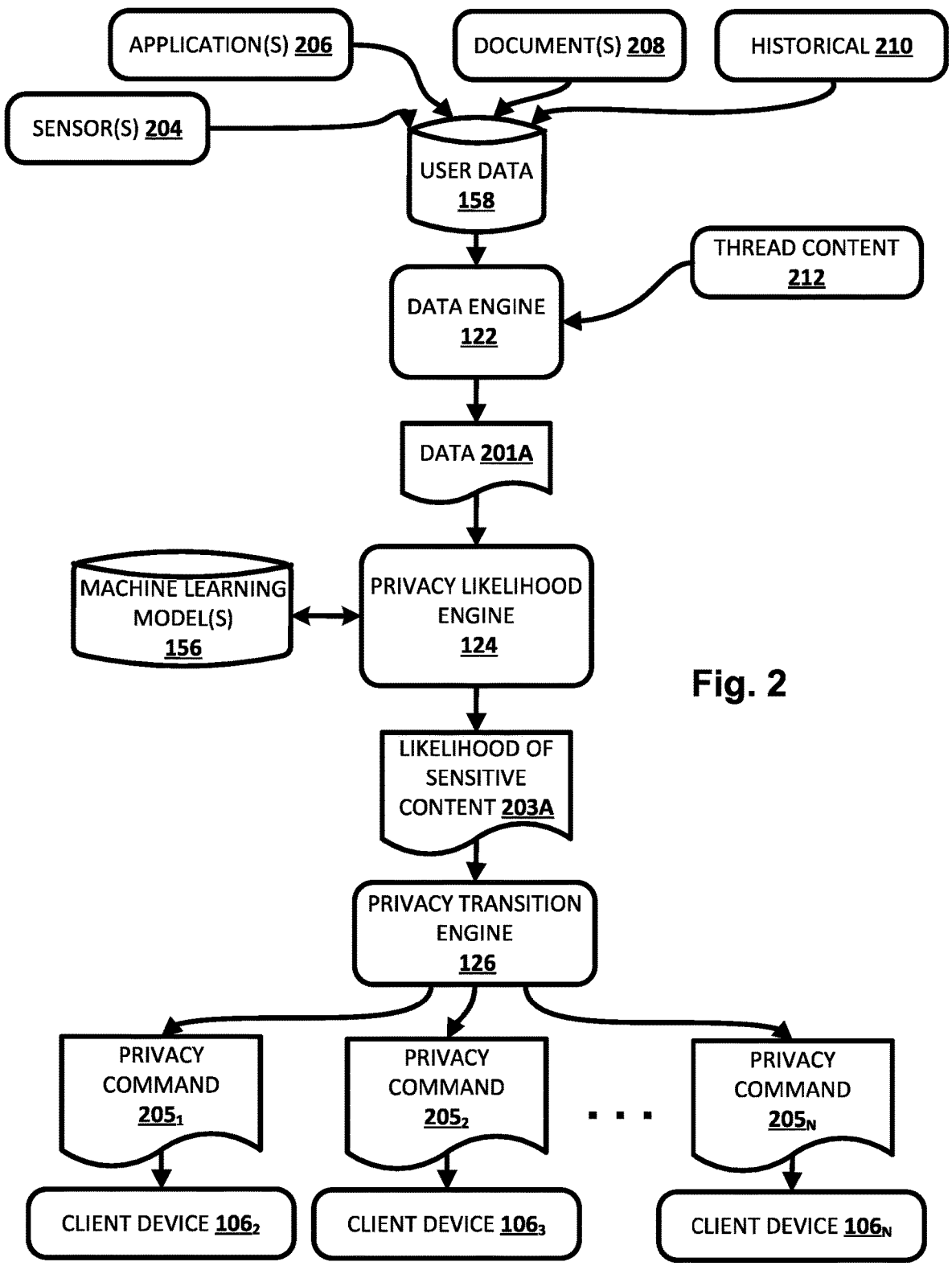
FIG. 2 illustrates an example of using components of the example environment of FIG. 1 in triggering application transition into a private state.

FIG. 2 illustrates an example of using components of the example environment of FIG. 1 in determining likelihoods that message exchange thread participants would deem content of an ongoing message exchange thread to be sensitive. In FIG. 2, user data 158 is generated based on output from sensors 204 of the client device 106$_1$, states and/or other data from applications 206 of the client device 106$_1$, documents 208 created and/or accessed via the client device 106$_1$, and historical data 210 that indicates historical behavior associated with the message exchange thread participant that operates client device 106$_1$. The output from the sensor(s) 204 is used to generate sensor-based data of the user data 158. The output from the application(s) 206 and the document(s) 208 are used to generate computer-based action data of the user data 158. The historical data 210 is used to create/identify historical behavior of the user data 158. In some implementations, the user data 158 may be generated based on output generated by sensors of, and/or user actions via, additional or alternative electronic devices of the user (e.g., sensors of a watch of the user that is in electronic communication with the client device 106$_1$).

The data engine 122 selects, from the user data 158, a subset of data 201A for providing to the privacy likelihood engine 124. In FIG. 2, privacy likelihood engine 124 may apply the data 201A, along with message exchange thread content 212, as input to one of the machine learning models 156 and generate output over the machine learning model based on the applied input. The generated output may directly indicate a likelihood that the message exchange thread participant would deem content of the message exchange thread to be sensitive, and may be provided to the privacy transition engine 126. As one example, the input applied to the machine learning model may be a vector of values that are based on the data 201A and that include values based on sensor-based data, computer-based action data, and historical behavior data, as well as the content 212 of the ongoing message exchange thread. The content 212 of the ongoing message exchange thread may include text and/or other content (e.g., images, sounds, etc.) that has been inserted (e.g., by a participant operating a message exchange client 107) into the ongoing message exchange thread. The output 203A may indicate, for example, a likelihood that a message exchange thread participant would deem content of the message exchange thread (whether already inserted into the thread or upcoming) to be sensitive.

Based on the output 203A, the privacy transition engine 126 determines whether to transition the local message exchange client 107 operating on client device $106_1$ to a private state. In some implementations, the privacy transition engine 126 also transmits, e.g., to one or more other client devices $106_{2-N}$ operating message exchange threads $107_{1-N}$ that are being used by participants to participate in the ongoing message exchange thread, privacy commands $205_{1-N}$. As noted above, in various implementations, the other client devices $106_{2-N}$ may transition to private states automatically, may prompt their respective participants for permission to transition to private states, etc.

In some implementations, the privacy transition engine 126 transmits the privacy commands $205_{1-N}$ to corresponding additional client devices 106 directly. In some other implementations, the privacy transition engine 126 transmits the privacy commands $205_{1-N}$ to one or more intermediate components (e.g., electronic communications system 110), which then transmit the status notification to the corresponding additional client devices. In some implementations, the privacy transition engine 126 automatically transmits the privacy commands $205_{1-N}$. In some other implementations, the privacy transition engine 126 only transmits the privacy commands $205_{1-N}$ in response to affirmative user interface input of the user provided via client device $106_1$. Although FIG. 2A illustrates three separate privacy commands being provided to different client devices, in some implementations more or fewer privacy commands may be transmitted and/or may be transmitted for presentation to more or fewer additional message exchange thread participants.

Figure 3:
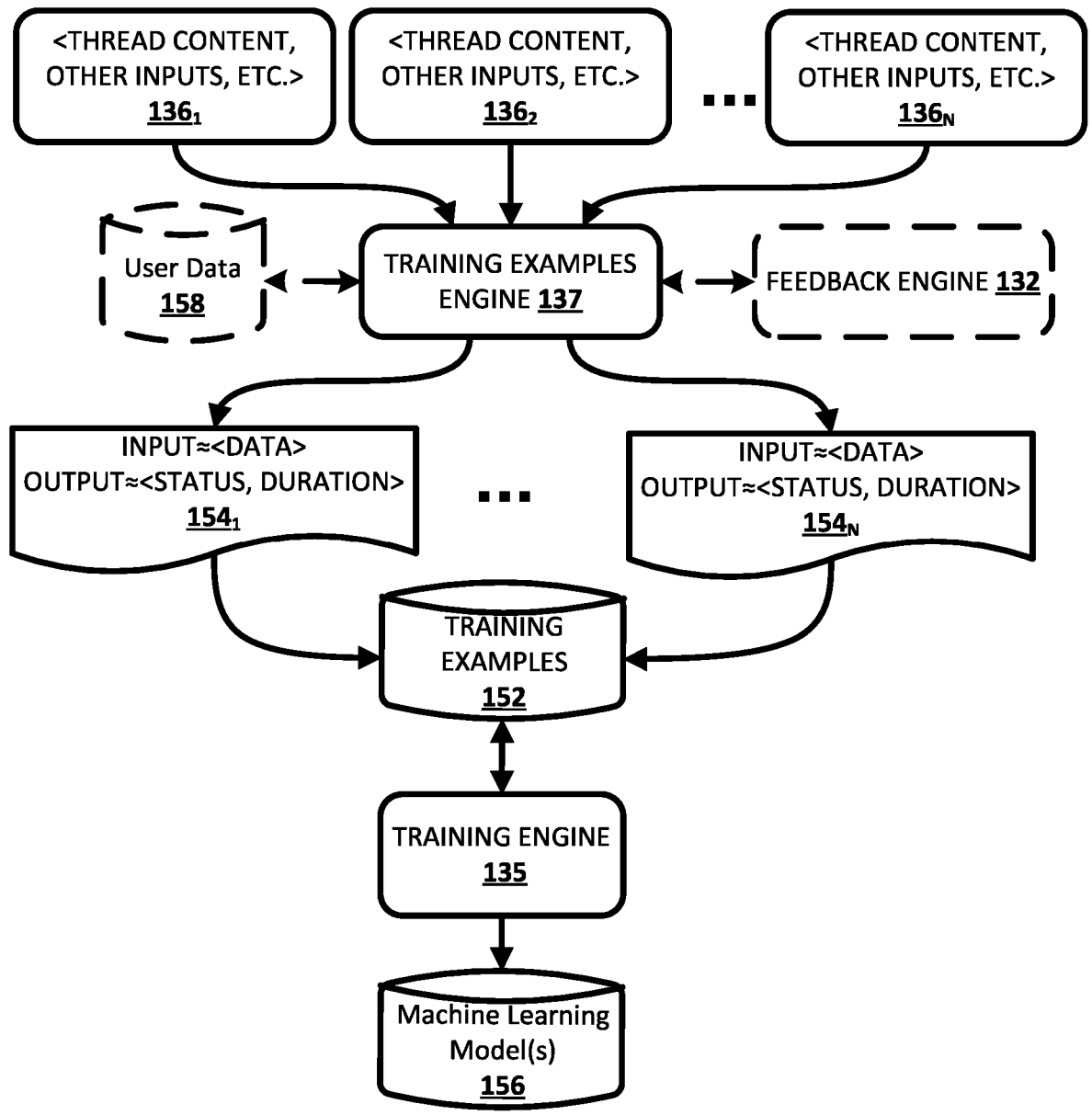
FIG. 3 illustrates an example of using components of the example environment of FIG. 1 in training one or more machine learning models.

FIG. 3 illustrates an example of using components of the example environment of FIG. 1 in training one or more machine learning model(s) 156 for use, in FIG. 2, in determining a likelihood that a message exchange participant would deem content of an ongoing message exchange thread to be sensitive.

In FIG. 3, training data instances $136_{1-N}$ are received by the training examples engine 137. Each of the training data instances include content of a message exchange thread and other inputs (e.g., sensor-based data, computing-based action data, historical data) that were applicable, e.g., to a particular message exchange thread participant, when a message exchange client 107 operated by the participant was transitioned (automatically or manually) into or out of a private state. For example, training data instance $136_1$ may include a first vector of message exchange thread content, data values and an indication of whether the transition into private state was automatic or manual. Also, for example, training data instance $136_2$ may include a second vector of message exchange thread content, data values and an indication of whether the transition into private state was automatic or manual. In some implementations, at least some of the training data instances may be generated based on a corresponding message exchange thread participant manually transitioning a message exchange client 107 into (or out of) a private state. Additionally or alternatively, in some implementations, at least some of the training data instances may be generated based on a corresponding message exchange client 107 being automatically transitioned into (or out of) a private state. Additional or alternative techniques for generating training data instances may be utilized.

The training examples engine 137 utilizes the training instances to generate training examples $154_{1-N}$. Each of the training examples $154_{1-N}$ includes training example input that is based on the data of a corresponding training data instance, and training example output that indicates, for instance, whether the transition into (or out of) a private state was desirable or undesirable (which may be determined, for instance, from feedback engine 132).

The generated training examples $154_{1-N}$ are stored as training examples 152 that are utilized by the training engine 135 to train at least one of the machine learning models 156. In some implementations, the training engine 135 trains a machine learning model based on the training examples 152 based on application of the training example input of the training examples and backpropagation based on the training example output of the training examples.

In some implementations, the same trained machine learning model 156 may be utilized for the client device $106_1$ and for other client devices of other users. In some implementations, the trained machine learning model 156 that is utilized for the client device $106_1$ may optionally be further trained based on user data 158 of the message exchange thread participant that operates the client device $106_1$ and/or based on feedback of the participant provided by the feedback engine 132. Further training of the machine learning model 156 based on user data 158 and/or based on feedback of the message exchange thread participant may enable the machine learning model to be further tailored to the message exchange thread participant that operates a particular client device 106. As one example, past data of the user data 158 may directly indicate a transition into/out of private state and associated data for a participant, and can be utilized by the training examples engine 137 to generate one or more additional training examples for use by the training engine 135.

Figure 4A:
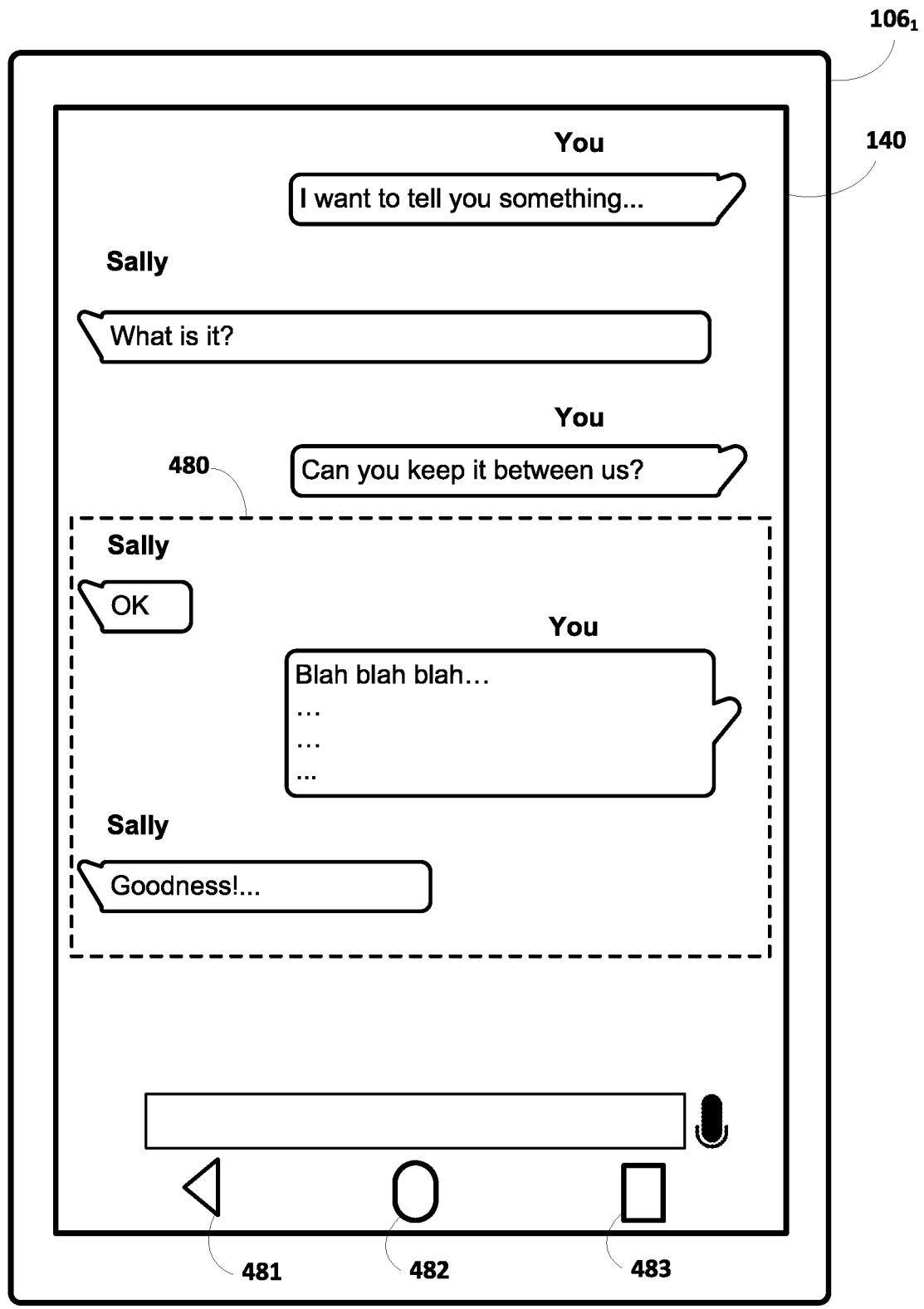
FIG. 4A and FIG. 4B each illustrate an example client device and one or more examples of how a private mode may be triggered automatically.
Figure 4B:
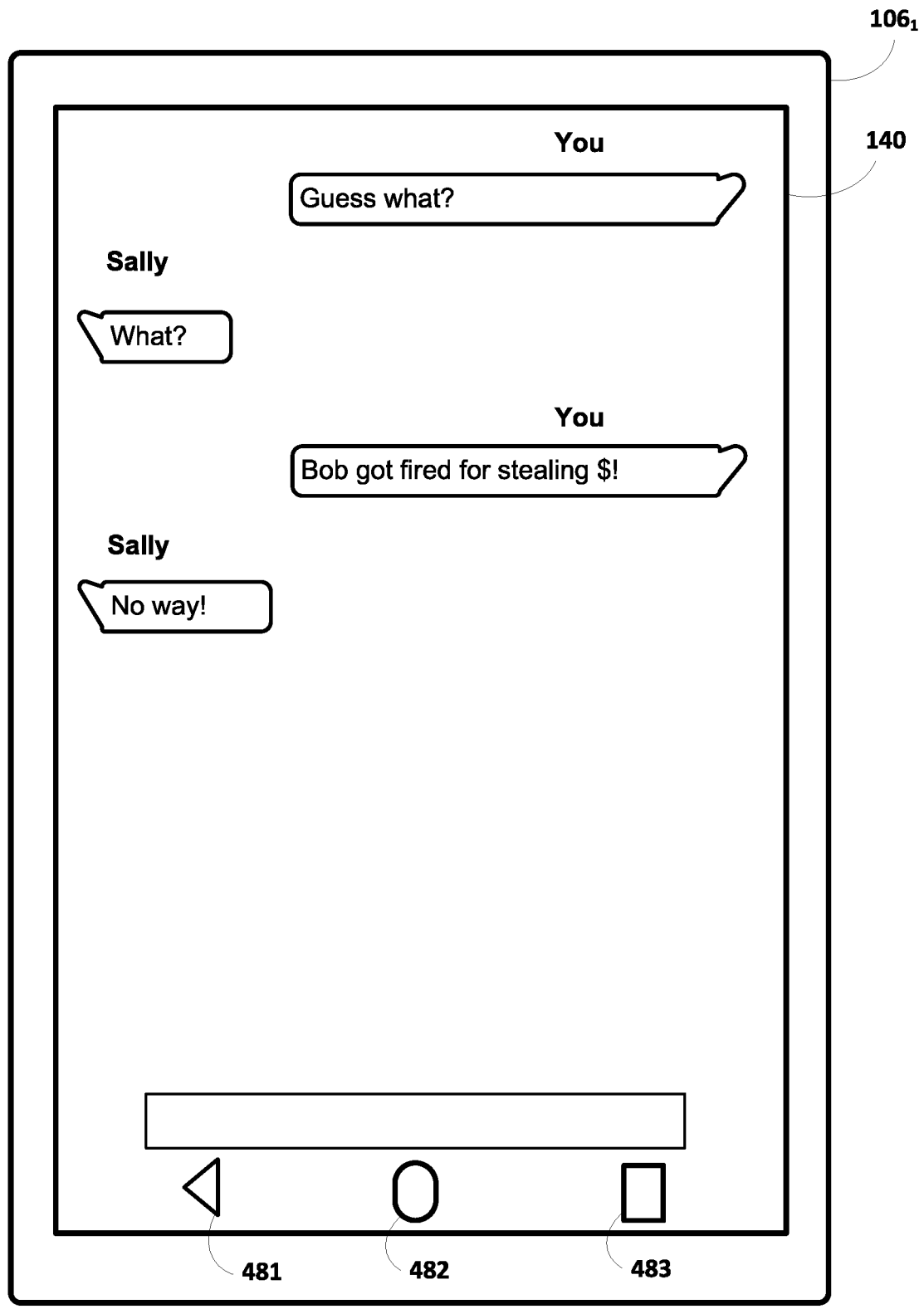

Turning now to FIGS. 4A-C, additional description is provided of various components and techniques described herein. FIGS. 4A-B illustrate the example client device $106_1$ of FIG. 1 and one or more examples of how a message exchange client (not depicted in FIGS. 4A-B) may be transitioned into a private state in response to a determination that there is a sufficient likelihood that at least one participant in the ongoing message exchange thread would deem content of the message exchange thread to be sensitive. The client device $106_1$ of FIGS. 4A and 4B includes a display screen 140. The display screen 140 also includes system interface elements 481, 482, 483 that may be interacted with by the user to cause the client device $106_1$ to perform one or more actions.

In FIG. 4A, a first message exchange thread participant ("You" in FIG. 4A) that operates client device $106_1$ has provided a first message into the ongoing message exchange thread of "I want to tell you something . . . ." Another participant, Sally, replied "What is it?" The first participant then states, "Can you keep it between us?" In various implementations, such a statement may be deemed a "privacy trigger phrase" that, when detected, causes a message exchange client 107 (not depicted in FIG. 4A) operated by the first participant to transition into a private state (or at least prompt the first participant as to whether they'd like to transition into the private state). As noted above, privacy trigger phrases may include other similar phrases such as "off the record," "let's keep this between us," "can you promise to not tell anyone?," etc. In some such implementations, one or more messages that follow (or in some cases, precede) such a privacy trigger phrase may not be retained, e.g., until the first participant manually transitions the message exchange client out of privacy state or until it is detected that the topic of discussion has changed to less-sensitive subject matter. Consequently, Sally's reply of "OK," as well as message content provided by the first participant thereafter (i.e., the content enclosed by box 480), may not be retained, e.g., in a transcript or log of the ongoing message exchange thread. Additionally or alternatively, in some implementations, messages exchanged following the transition may be obfuscated (e.g., replaced with nonsensical text or symbols, or redacted) prior to being stored in a transcript or log.

Privacy trigger phrases may be manually configured or learned over time. For example, a privacy trigger phrase may simply be one component of thread content 212 (see FIG. 2) that is applied (with one or more other inputs) over a machine learning model to determine a likelihood that a message exchange thread participant would deem message exchange thread to be sensitive. In some implementations, privacy trigger phrases may be learned when message exchange thread participants provide certain phrases, immediately before or after manually transitioning message exchange clients 107 into private states. Thus, for instance, as more message exchange thread participants transition their message exchange clients 107 into private states before or after stating something like "Can we keep this on the down low?", such phrases may be used as part of more and more training examples that train a machine learning model. Of course, message exchange threads may be transitioned out of private states in response to other, so-called "non-privacy trigger phrases." For example, a phrase such as "on a lighter note . . . " or "let's go back on the record" may trigger transition of one or more message exchange clients 107 from private states to non-private states.

In addition to or instead of privacy trigger phrases, in some implementations, one or more n-grams, alone or in combination, that form part of message exchange thread content may be used as signals. In FIG. 4B, for instance, a first message exchange thread participant that operates client device 106₁ has provided a first message into the ongoing message exchange thread of "Guess what?" Another participant, Sally, replied "What?" The first participant then states, "Bob got fired for stealing $!" In various implementations, various n-grams of such a statement, such as a particular known entity's name ("Bob"), or other n-grams (e.g., "fired," "steal") may, alone or in combination, trigger a message exchange client 107 (not depicted in FIG. 4B) operated by the first participant to transition into a private state (or at least prompt the first participant as to whether they'd like to transition into the private state). Additionally, while all the triggering n-grams in FIG. 4B are contained in a single statement by the first participant, this is not meant to be limiting. In various implementations, n-grams from different messages provided by different participants may also be used in combination to trigger transition of a message exchange client into a private state.

FIG. 4C depicts an example of a portion of a saved transcript of the message exchange thread depicted in FIG. 4B. In this example, the message from the first participant stating "Bob got fired for stealing $" has been at least partially obfuscated so that the name "Bob" and the n-gram "stealing" have been scrambled. In various implementations, this content may be persisted, instead of the uncensored content, in order to prevent others from viewing the potentially sensitive statement.

In addition to or instead of the above-identified signals that may trigger transition of a message exchange client to a private state, in some implementations, general topics of discussion (alone or in combination with aspects of historical user behavior) may trigger transition into a private state. For example, in some implementations, discussion of potentially-sensitive topics such as health issues, crude language, politics, personal information, financial information, and so forth, may cause a message exchange client (or all message exchange clients partaking in a message exchange thread) to transition to a private state. Of course, which topics trigger transition into a private state may change and/or evolve over time. For example, and as described above, various machine learning models may be continuously trained over time to identify when potentially-sensitive topics are being discussed. For example, one or more machine learning models may be trained with training examples representing instances in which particular topics are discussed in message exchange threads, and in which one or more message exchange thread participants manually transition their respective message exchange clients to private states.

Additionally or alternatively, one or more machine learning models may be trained with training examples representing instances in which particular topics are discussed in message exchange threads, and one or more message exchange clients are automatically transitioned to private states (and the respective participants do not provide negative feedback or provide positive feedback). Similar techniques may be used to automatically transition message exchange clients out of a private state. For instance, suppose one or more participants in a message exchange thread are discussing a sensitive topic, which caused one or more of their respective message exchange clients 107 to transition into private states. Suppose further that the participants change the topic of discussion to a topic of less sensitivity. In various implementations, that change in topic may trigger transition by one or more of the message exchange clients 107 from the private state back into a non-private state (in which message exchange thread content is not obfuscated and is retained in native form).

Various techniques may be employed to determine topics of discussion in a message exchange thread. In some implementations, one or more topic classifiers may be employed, e.g., on an ongoing basis using a sliding window of message exchange thread content, to identify one or more current topics of discussion. Topic classifiers may take the form of machine learning models or rules-based models. With machine learning-based topic classifiers, in some implementations, a topic classifier may be trained to provide output indicative of whether a particular topic is being discussed (e.g., binary output, or a probability). In other implementations, a topic classifier may be trained to provide output indicative of whether a plurality of different topics are being discussed. For example, a topic classifier may be configured to provide output indicating likelihoods or confidences that a plurality of different topics are being discussed. In some implementations, only those topics that have likelihoods/confidences that satisfy one or more thresholds may be identified as topics of discussion. In other implementations, only the n highest likelihood/confidence topics may be identified as topics of discussion.

As noted above, in addition to content of a message exchange thread, other signals may be considered when determining a likelihood that content of an ongoing message exchange thread would likely be deemed by at least one message exchange thread participant to be sensitive. In some implementations, contextual signals or cues associated with one or more client devices 106 (e.g., sensor data 204 in FIG. 2) operated by message exchange thread participants may be analyzed. Suppose a particular message exchange thread participant tends to manually transition a message exchange client to a private state during particular times of day and/or while the participant is in a particular location. In various implementations, during those same times of day and/or while the participant is at the same particular location, the participant's message exchange client may be automatically transitioned into a private state.

In some implementations, states of one or more applications operating on a client device 106 may also be used to determine a likelihood that content of an ongoing message exchange thread would likely be deemed by at least one message exchange thread participant to be sensitive. Suppose a particular message exchange thread participant operating a message exchange client 107 on a client device 106 also has a web browser open the client device 106, and the web browser is manually transitioned to a private state. In some implementations, particularly if the participant (or participants generally) tends to transition a message exchange client 107 into a private state while browsing in a private state, the fact that the web browser is currently in a private state may trigger (alone or in combination with other signals described herein) the message exchange client to also transition to a private state. More generally, in some implementations, when a message exchange client 107 is transitioned into a private state (manually by a message exchange participant or automatically without negative feedback), one or more states of one or more other applications operating on the participant's client device 106 may be used as features of vector that is used as a training example to (further) train a machine learning model.

Various aspects of documents (e.g., 208 in FIG. 2) may also be considered when determining a likelihood that one or more message exchange thread participants would deem message exchange thread content to be sensitive. Suppose a user has a document stored on his client device 106 (and/or in cloud storage), and that the document is configured with heavy security protections (e.g., password protected, limited number of users with access, encrypted, etc.). In some implementations, topics associated with that document and/or its metadata may be flagged as sensitive based on the heavy security protections. In some implementations, discussion of such topics by an owner of the document in a message exchange thread may trigger transition of a message exchange client 107 operated by the owner into a private state. Additionally or alternatively, if the document owner or another message exchange thread specifically references the document (e.g., provides a link to the document, permission to access the document, etc.) in the message exchange thread, one or more message exchange clients 107 operated by participants of the message exchange thread may be transitioned into a private state.

While examples described herein have typically included multiple human message exchange thread participants, this is not meant to be limiting. As noted above, in some implementations, a message exchange thread may exist between a single human participant and a non-human participant, such as an automated assistant. In some such implementations, techniques described herein may be employed to automatically transition the message exchange client used by the human participant into a private state, e.g., to refrain from persisting or to obfuscate messages exchanged with the automated assistant.

In some implementations, it is possible that techniques described herein could be used to obfuscate or otherwise refrain from persisting messages exchanged between purely non-human participants. For example, messages exchanged between multiple automated assistants associated with different application, domains (e.g., personal automated assistant exchanging messages with a food delivery automated assistant), etc., could be obfuscated and/or not stored based on the messages containing content that is deemed likely to be sensitive to one or more humans, e.g., a user on whose behalf one or more of the automated assistants is acting, and/or a user served by one or more of the automated assistants.

Suppose a first individual is shopping for a birthday present for a second individual. Suppose further that both individuals tend to interact with the same automated assistant, e.g., operated by a standalone interactive speaker in a household. If the first individual engages in a human-to-computer dialog with the automated assistant to search for suitable birthday presents, the first individual would likely deem any messages exchanged with the automated assistant to be sensitive because the first individual would not want the second individual to consume the content. Accordingly, the automated assistant may, e.g., in response to spoken n-grams such as "birthday present" and an identity of the second individual, or in response to an utterance like "What should I get Alice for her birthday?", transition into a private state in which the automated assistant ceases to persist content of the human-to-computer dialog between the first individual and the automated assistant. Additionally or alternatively, if the first individual uses a graphical user interface such as a message exchange client 107 to converse with the automated assistant, the message exchange client 107 may transition into a private state. Similar transition into private state may occur during human-to-computer dialog when, for instance, the human discusses potentially sensitive topics such as finances, health, or other topics known or learned to be sensitive.

Figure 5:
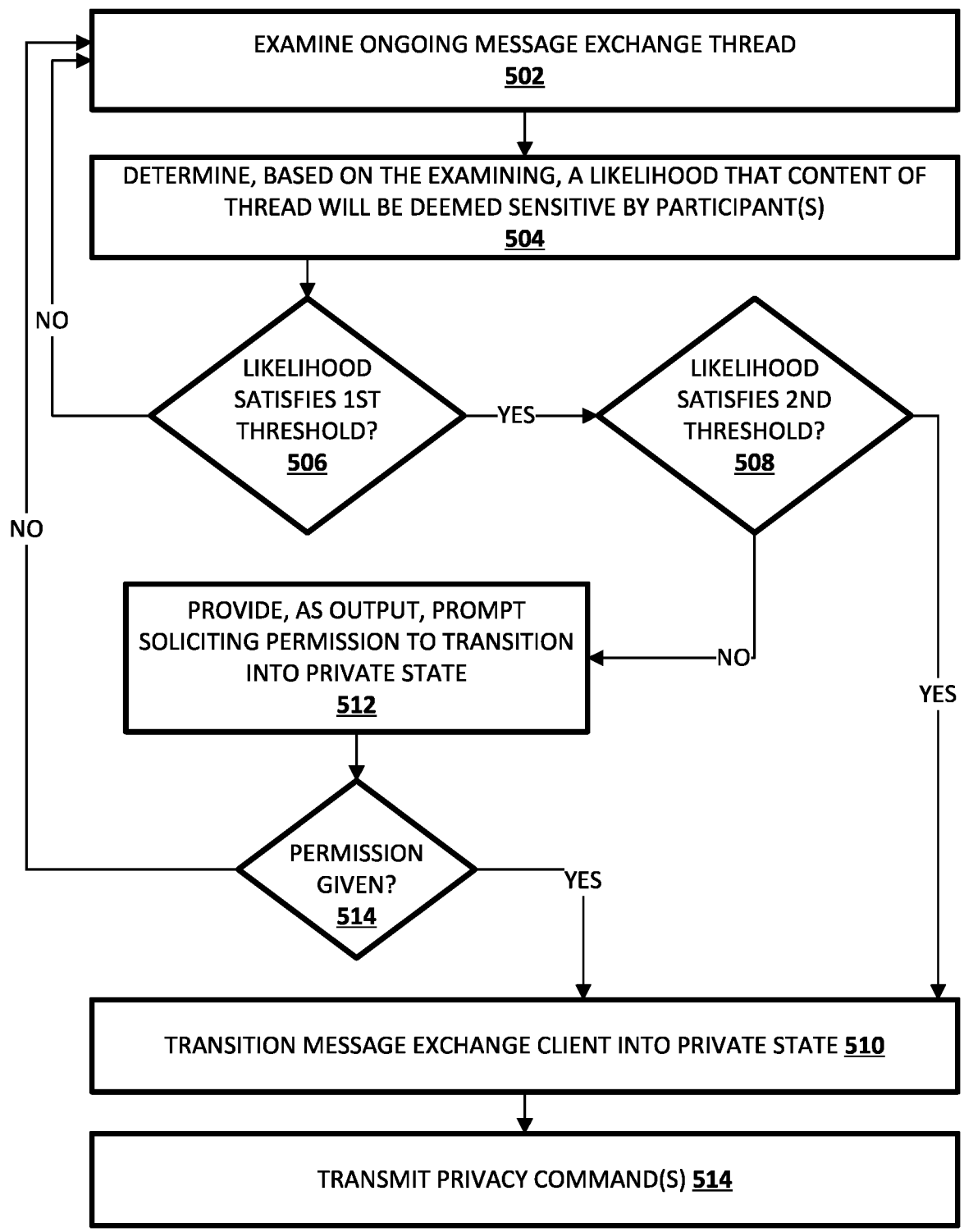
FIG. 5 is a flowchart illustrating an example method of automatically transitioning an application into a private state according to implementations disclosed herein.

FIG. 5 is a flowchart illustrating an example method 500 of determining a likelihood that content of a message exchange thread would be deemed sensitive by one or more participants, and transitioning one or more message exchange clients or other components into private states, according to implementations disclosed herein. For convenience, the operations of the flow chart are described with reference to a system that performs the operations. This system may include various components of various computer systems, such as one or more components of privacy status system 120. Moreover, while operations of method 500 are shown in a particular order, this is not meant to be limiting. One or more operations may be reordered, omitted or added.

At block 502, the system examines content of an ongoing message exchange thread. As noted above, in some implementations, the system may employ a sliding window to examine a particular portion of an ongoing message exchange thread. In various implementations, the size of the sliding window may be determined temporally and/or spatially. For example, the sliding window of examined content may only include content from the last x minutes, the last y messages, etc. (wherein x and y are non-zero integers). In other implementations, each message incorporated into a message exchange thread, or even portions of each message, may be examined. In various implementations, message exchange participants may have the option of disabling this examination (which would prevent remaining operations of method 500 from being performed).

At block 504, the system may determine, based at least in part on the examination of block 502, a likelihood that content of the message exchange thread would be deemed sensitive by one or more message exchange thread participants. In some implementations, this likelihood may be determined based solely on content of the message exchange thread (e.g., privacy trigger phrases, various combinations of n-grams, sensitive topics of discussion, etc.). In other implementations, this likelihood may be determined based additionally on other signals, such as sensor data from one or more client devices operated by message exchange thread participants, documents stored or otherwise controlled by one or more message exchange participants, historical behavior of one or more message exchange thread participants (e.g., under what circumstances have participant(s) manually triggered transition into private state or not objected to automatic transition to private state), etc. As noted above, in some implementations, various inputs may be taken from the message exchange thread content and/or from these other signals and applied as inputs to a machine learning model. The machine learning model may be trained to provide output indicative of the likelihood.

At block 506, the system may determine whether the likelihood determined at block 504 satisfies a first threshold. If the answer is no (e.g., the likelihood is relatively low that any participant would deem the message exchange thread content to be sensitive), then method 500 may proceed back to block 502, and examination of the message exchange thread content may resume. If the answer at block 506 is yes, however, then method 500 may proceed to block 508. At block 508, the system may determine whether the likelihood determined at block 504 satisfies a second threshold, which in many cases may be higher than the first threshold associated with block 506. If the answer at block 508 is yes (e.g., the message exchange content is deemed highly likely to be sensitive to one or message exchange thread participants), then method 500 may proceed to block 510. At block 510, one or more message exchange clients operated by one or more message exchange thread participants may be transitioned automatically to private states in which content of the message exchange thread is obfuscated or not retained.

On the other hand, if the answer at block 508 is no (e.g., there is a reasonable likelihood that a message exchange thread participant would deem the message exchange thread content to be sensitive but the likelihood is not so high as to be certain), then method 500 may proceed to block 512. At block 512, a prompt soliciting permission from one or more message exchange thread participants to transition a message exchange client into a private state may be provided as audible or visual output, e.g., by a message exchange client. At block 514, if a participant grants the solicited permission, then method 500 may proceed to block 510, which was described previously. If the answer at block 514 is no, then method 500 may proceed back to block 502, and no transition into a private state may be triggered.

Back at block 510, in some implementations, the system may transmit, or cause one or more message exchange clients to transmit, one or more privacy commands to other message exchange clients (or more generally, client devices) that are being used to participant in the message exchange thread. These privacy commands may cause the recipient message exchange clients (or more generally, recipient client devices) to transition (e.g., automatically or in response to a user providing permission at a prompt) into private states. While not depicted in FIG. 5, in some implementations, transmission of privacy commands to various message exchange clients may be conditioned on the likelihood determined at block 504. If the likelihood satisfies a particular threshold (e.g., the second threshold associated with block 508), the privacy commands may be automatically transmitted. However, if the likelihood fails to satisfy such a threshold, then the privacy commands may be transmitted only in response to a participant granting such permission, e.g., in response to a prompt soliciting such permission.

In addition to or instead of prompting message exchange thread participants for permission to transition message exchange clients into private states, in some implementations, message exchange clients may be transitioned automatically, and then participants may have the opportunity to provide feedback about the automatic transition. For example, a user may be notified, e.g., via audible or visual output, that their client device and/or message exchange client has transitioned into a private state. The participant may then provide feedback, such as manually transitioning back into non-private state, or providing some other input indicative of disapproval of the transition. Based on this feedback, the system may "learn" (e.g., by way of using that instance as the basis for a machine learning model training example) that under the current circumstances, the participant does not wish to transition into a private state. And of course, similar techniques to those depicted in FIG. 5 may be used to transition a message exchange client (or more generally, a client device) out of a private state and into a non-private (or less private) state automatically.

In various implementations, message exchange clients may be operating on client devices along with any number of other applications. In some implementations, one or more of these other (e.g., third party) applications may be able to "listen in" to message exchange threads participated in by the message exchange clients. For example, a take-out ordering application may listen to message exchange threads between users to determine, for instance, whether the users are discussing dinner (in which case the take-out ordering application may join the message exchange thread and offer to place a take-out order). As another example, in some implementations, one or more searching applications may be listening in to message exchange threads to determine whether to use exchange content to prepare and submit search queries. In any case, in some implementations, if participants in a message exchange are determined to be discussing potentially sensitive information, thereby causing one or more message exchange clients to transition into private states, then content of the message exchange thread may be obfuscated or otherwise not provided to such third party applications.

Figure 6:
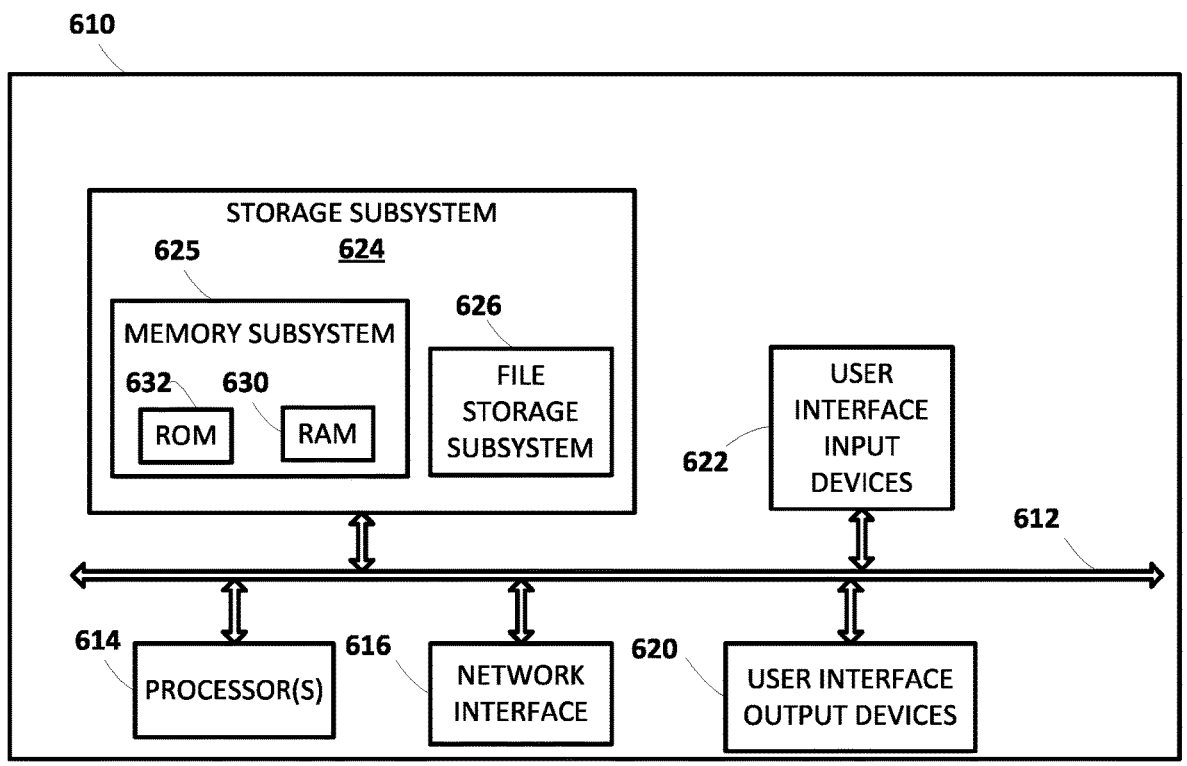
FIG. 6 illustrates an example architecture of a computing device.

FIG. 6 is a block diagram of an example computing device 610 that may optionally be utilized to perform one or more aspects of techniques described herein. In some implementations, one or more of the client computing devices $106_{1-N}$, privacy status system 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 of FIG. 5.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information (e.g., messages exchanged in message exchange threads), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, message exchange thread participants operating message exchange clients configured with selected aspects of the present disclosure may opt out of having message exchange thread content monitored, e.g., so that a participant desiring transition of a message exchange client into or out of a private state would do so manually.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   examining an ongoing message exchange thread between two or more participants operating two or more respective message exchange clients;
   applying a plurality of inputs across a machine learning model to predict a likelihood that one or more messages directed by one of the two or more participants to another of the two or more participants as part of the ongoing message exchange thread would be deemed private by at least a given participant of the two or more participants, wherein the machine learning model is trained to provide, based on the plurality of inputs, output that includes the predicted likelihood, and wherein the plurality of inputs include at least one input associated with the given participant and another input corresponding to the one or more messages directed by one or more of the two or more participants to the another of the two or more participants;
   determining that the likelihood satisfies a first threshold;
   determining that the likelihood satisfies a second threshold;
   automatically transitioning a first message exchange client one or more of the two or more message exchange clients into a private state in response to determining that the likelihood satisfies the first threshold; and
   transmitting, to a second message exchange client of the two or more message exchange clients, a command that causes the second message exchange client to transition to the private state, wherein the transmitting is performed in response to determining that the determined likelihood satisfies the first or second thresholds.

2. The method of claim 1, wherein the machine learning model comprises a neural network.

3. The method of claim 1, wherein the machine learning model is trained using labeled training examples associated with historical instances of message exchange threads in which message exchange thread participants manually transitioned message exchange clients into private states.

4. The method of claim 3, wherein features of the labeled training examples include n-grams contained in the historical instances of message exchange threads.

5. The method of claim 3, wherein features of the labeled training examples include phrases contained in the historical instances of message exchange threads.

6. The method of claim 3, wherein features of the labeled training examples include contextual cues associated with participants of the historical instances of message exchange threads.

7. The method of claim 1, further comprising:
causing a prompt to be rendered at one or more of the message exchange clients in response to determining that the likelihood satisfies the second threshold, wherein the prompt solicits permission to transition one or more of the two or more message exchange clients into a private state.

8. A system comprising one or more processors and memory storing instructions that, in response to execution by the one or more processors, cause the one or more processors to:
examine an ongoing message exchange thread between two or more participants operating two or more respective message exchange clients;
apply a plurality of inputs across a machine learning model to predict a likelihood that one or more messages directed by one of the two or more participants to another of the two or more participants as part of the ongoing message exchange thread would be deemed private by at least a given participant of the two or more participants, wherein the machine learning model is trained to provide, based on the plurality of inputs, output that includes the predicted likelihood, and wherein the plurality of inputs include at least one input associated with the given participant and another input corresponding to the one or more messages directed by one or more of the two or more participants to the another of the two or more participants;
determine that the likelihood satisfies a first threshold;
determining that the likelihood satisfies a second threshold;
automatically transition a first message exchange client one or more of the two or more message exchange clients into a private state in to determining that the likelihood satisfies the first threshold; and
transmit, to a second message exchange client of the two or more message exchange clients, a command that causes the second message exchange client to transition to the private state, wherein the transmitting is performed in response to determining that the determined likelihood satisfies the first or second thresholds.

9. The system of claim 8 wherein the machine learning model comprises a neural network.

10. The system of claim 8 wherein the machine learning model is trained using labeled training examples associated with historical instances of message exchange threads in which message exchange thread participants manually transitioned message exchange clients into private states.

11. The system of claim 10, wherein features of the labeled training examples include n-grams contained in the historical instances of message exchange threads.

12. The system of claim 10, wherein features of the labeled training examples include phrases contained in the historical instances of message exchange threads.

13. The system of claim 10, wherein features of the labeled training examples include contextual cues associated with participants of the historical instances of message exchange threads.

14. The system of claim 8 further comprising instructions to: cause a prompt to be rendered at one or more of the message exchange clients in response to determining that the likelihood satisfies the second threshold, wherein the prompt solicits permission to transition one or more of the two or more message exchange clients into a private state.

15. At least one non-transitory computer-readable medium comprising instructions that, in response to execution by one or more processors, cause the one or more processors to:
examine an ongoing message exchange thread between two or more participants operating two or more respective message exchange clients;
apply a plurality of inputs across a machine learning model to predict a likelihood that one or more messages directed by one of the two or more participants to another of the two or more participants as part of the ongoing message exchange thread would be deemed private by at least a given participant of the two or more participants, wherein the machine learning model is trained to provide, based on the plurality of inputs, output that includes the predicted likelihood, and wherein the plurality of inputs include at least one contextual cue generated by a computing device operated by the given participant and another input comprising content of the message exchange thread;
determine that the likelihood satisfies a first threshold;
determining that the likelihood satisfies a second threshold;
automatically transition a first message exchange client one or more of the two or more message exchange clients into a private state in to determining that the likelihood satisfies the first threshold; and
transmit, to a second message exchange client of the two or more message exchange clients, a command that causes the second message exchange client to transition to the private state, wherein the transmitting is performed in response to determining that the determined likelihood satisfies the first or second thresholds.

16. The at least one non-transitory computer-readable medium of claim 15, wherein the machine learning model comprises a neural network.

17. The at least one non-transitory computer-readable medium of claim 15, wherein the machine learning model is trained using labeled training examples associated with historical instances of message exchange threads in which message exchange thread participants manually transitioned message exchange clients into private states.

18. The at least one non-transitory computer-readable medium of claim 17, wherein features of the labeled training examples include n-grams contained in the historical instances of message exchange threads.

19. The at least one non-transitory computer-readable medium of claim 17, wherein features of the labeled training examples include phrases contained in the historical instances of message exchange threads or contextual cues associated with participants of the historical instances of message exchange threads.

20. The at least one non-transitory computer-readable medium of claim 15, further comprising instructions to:
cause a prompt to be rendered at one or more of the message exchange clients in response to determining that the likelihood satisfies the second threshold, wherein the prompt solicits permission to transition one or more of the two or more message exchange clients into a private state.

* * * * *